Figure 7:
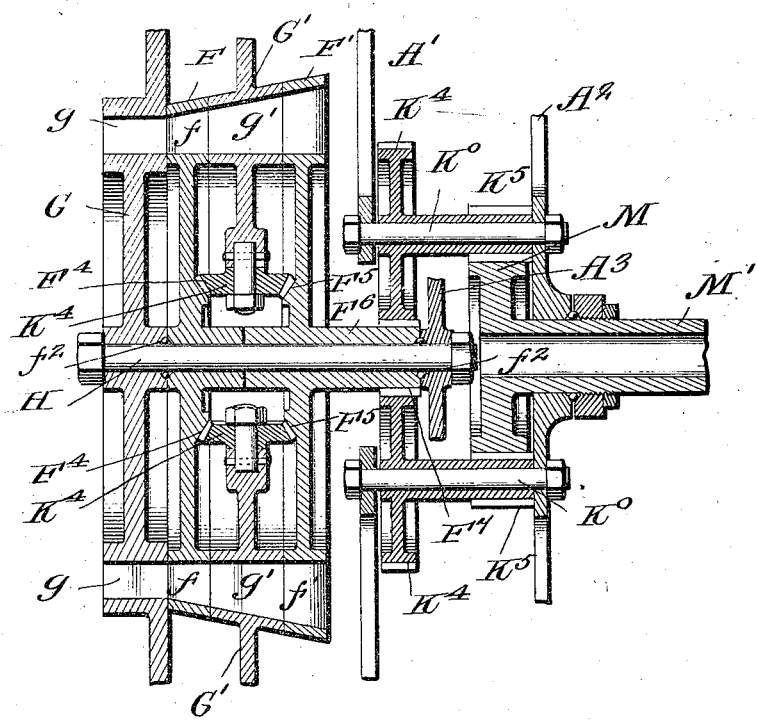

No. 858,266. PATENTED JUNE 25, 1907.
G. C. DAVISON.
AUTOMOBILE TORPEDO.
APPLICATION FILED OCT. 19, 1906.
5 SHEETS—SHEET 1.
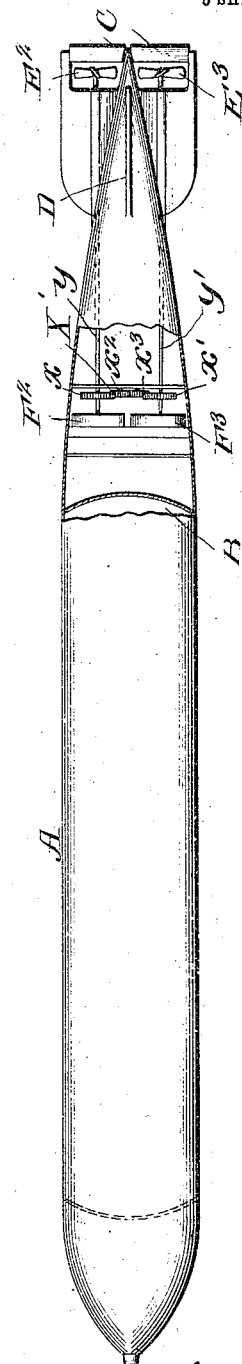

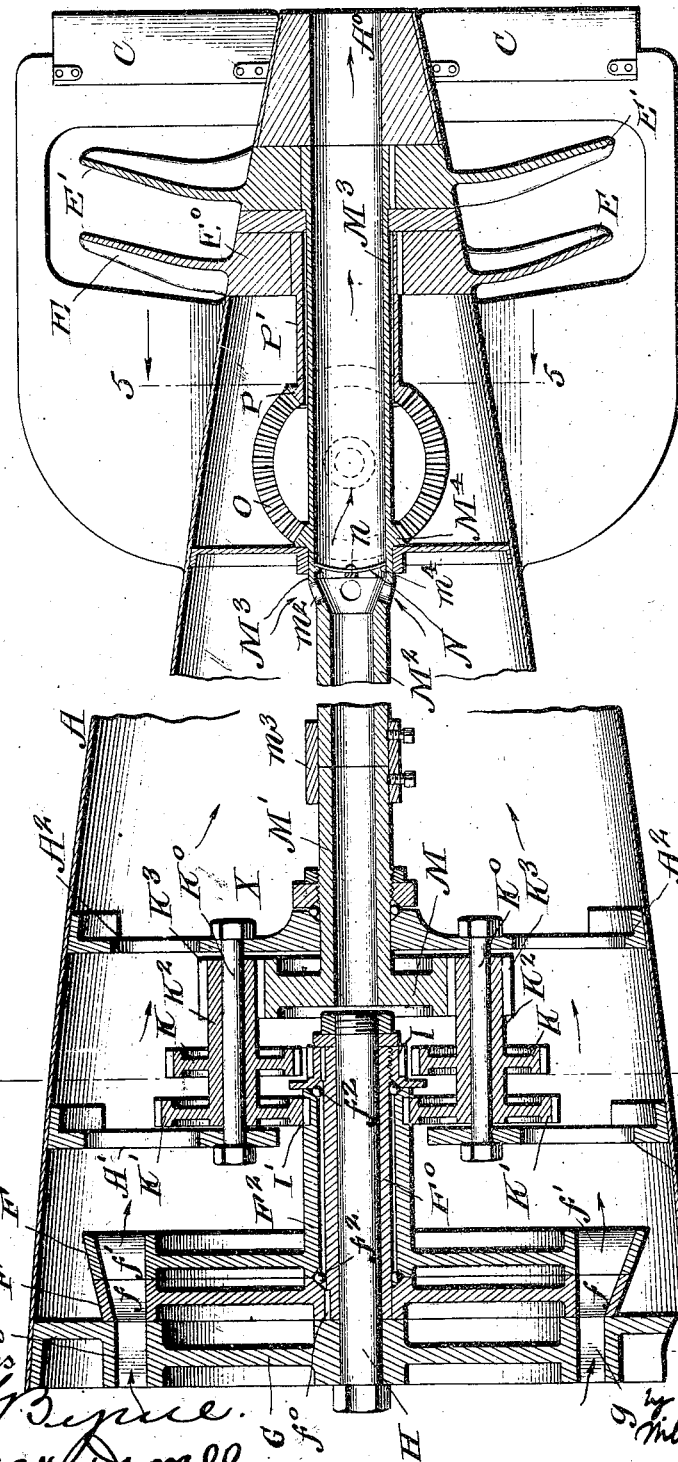

No. 858,266. PATENTED JUNE 25, 1907.
G. C. DAVISON.
AUTOMOBILE TORPEDO.
APPLICATION FILED OCT. 19, 1906.
5 SHEETS—SHEET 3.
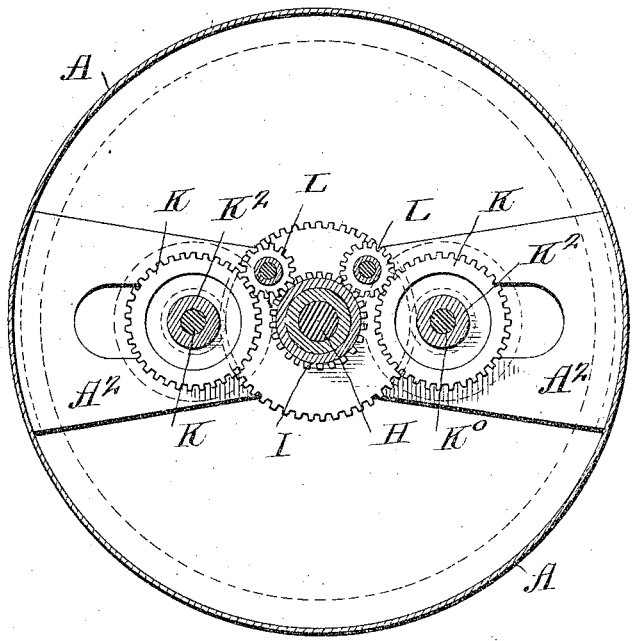
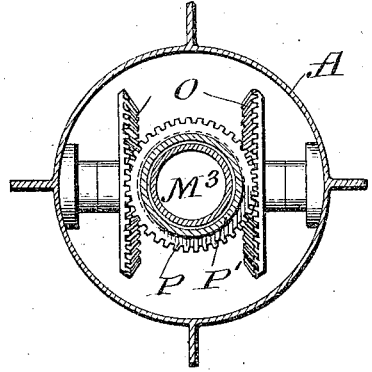
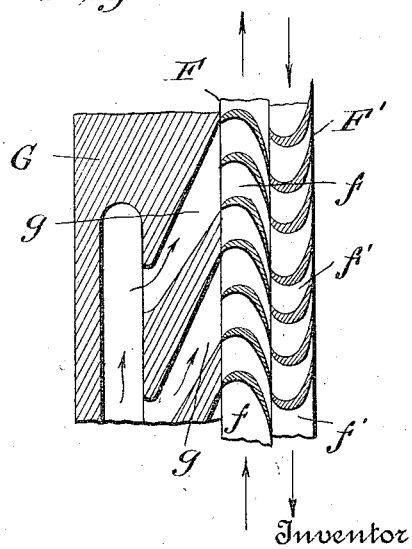

No. 858,266. PATENTED JUNE 25, 1907.
G. C. DAVISON.
AUTOMOBILE TORPEDO.
APPLICATION FILED OCT. 19, 1906.

5 SHEETS—SHEET 4.

No. 858,266. PATENTED JUNE 25, 1907.
G. C. DAVISON.
AUTOMOBILE TORPEDO.
APPLICATION FILED OCT. 19, 1906.

5 SHEETS—SHEET 5.

UNITED STATES PATENT OFFICE.

GREGORY C. DAVISON, OF THE UNITED STATES NAVY.

AUTOMOBILE TORPEDO.

No. 858,266.

Specification of Letters Patent.

Patented June 25, 1907.

Application filed October 19, 1906. Serial No. 339,710.

*To all whom it may concern:*

Be it known that I, GREGORY C. DAVISON, lieutenant commander, United States Navy, and a citizen of the United States, residing at Newport, in the county of Newport and State of Rhode Island, have invented certain new and useful Improvements in Automobile Torpedoes; and I do hereby declare the following to be a full, clear, and exact description of the invention, such as will enable others skilled in the art to which it appertains to make and use the same.

My invention relates to methods of and means for compensating torpedoes driven by turbines, or other forms of rotary engines or rotary devices, against errors in direction occasioned by the gyroscopic action of the rotating parts.

In a turbine driven automobile torpedo, as at present constructed, there are one or more (generally two) rotating turbine wheels and reducing gear connecting same to one or more (generally two) propellers. These turbine wheels rotate at a very high speed and frequently in the same direction, and with the reduction gearing, the propeller shaft, and other parts driven by the turbines, constitute in effect a series of fly wheels at varying speeds rotating about the same axis, with the sum of the moments of inertia of the various parts in one direction largely in excess of the moment of inertia of the one propeller, which rotates in the reverse direction. Since the mass of the torpedo after being discharged is held temporarily in a freely yielding medium, the air, and is afterward borne in another yielding medium, the water, the effect of this rotating mass from the interior of the torpedo is to cause the torpedo, as a whole, to act as a gyroscope, and in so acting certain deflecting forces are set up, which, up to the present time, have not been properly compensated for, especially with turbine driven torpedoes. In the well known Howell torpedo, which was driven by a rotating fly wheel, set transversely of the torpedo, and which torpedo is described in the Howell patent, No. 311,325, granted January 27, 1885, this gyroscopic action of the torpedo, as a whole, was recognized, and was used to steer the torpedo on a straight course; but the apparatus described in that patent, and shown in the Howell torpedo, was not suitable for application to turbine torpedoes as now constructed, and the attempt has been made to rectify such errors by the use of lead ballast, which reduced the carrying capacity of the torpedo, and was otherwise objectionable.

Before attempting to describe the method or means for correcting the error, it might be well to explain briefly the gyroscopic action of a fly wheel, which is rotated in bearings fixed in the shell of the torpedo. As is well known to scientists, if a fly wheel, free to move about the axes of X, Y, and Z, is rotating about any one of these, say the axis of X, and a force is applied, not parallel to the axis of X, tending to deflect the axis of the fly wheel, say in the direction of the axis of Y, then the axis of the fly wheel will not apparently yield to this force, but will tilt about the axis of Z. Now, as stated in the Howell patent aforesaid:—"If the fly wheel revolve about a horizontal axis, and an extraneous force act against the torpedo, so as to tend to turn it about a vertical axis, then the resulting motion of the fly wheel, (supposing the torpedo to yield) will not be about the vertical axis, but about a horizontal axis perpendicular to the plane of the other two axes." In other words, if the shaft of the rotating fly wheel is horizontal and transverse to the torpedo, any lateral deflecting force applied to the torpedo will tend to cause the torpedo to roll about a longitudinal axis; while, if the axis of the revolving fly wheels be fore and aft in the torpedo and horizontal, any lateral deflecting force applied to the torpedo will tend to cause the torpedo to rise or dive, according to the direction of the force, and the direction of rotation of the fly wheel. Again, if the fly wheel axis be transverse of the torpedo and vertical, any deflecting force tending to tilt the nose of the torpedo in the vertical plane will cause the torpedo to swerve or shear to the right or left, according to the direction of rotation of the fly wheel. In other positions of the axis of the fly wheel, the application of a deflective force would cause intermediate deviations, which can be readily followed out by applying the general rules just stated.

Reverting to the turbine driven torpedo, it will be noted that when the torpedo is in the air, after having been released from the torpedo tube, and before it strikes the water, the shell will be free to rotate, and there will be a rapidly rotating mass comprising the turbine wheels and connections mounted in the shell of the torpedo, all or nearly all rotating in one direction, and reaction due to the escaping gases and other causes will cause the shell of the torpedo to rotate in the opposite direction; but since the mass of the shell of the torpedo, with the parts rigidly attached thereto, far exceeds that of the turbine wheels, and the other rotating parts, the angular motion of the shell of the torpedo will be very small in spite of the fact that the angular velocity of the rotating parts is very high; but in practice it has been found that the torpedo shell often rolls, while in the air, through about 45 degrees when fired from the broad side of an ordinary torpedo boat destroyer. As soon as the torpedo strikes the water, if the nose strikes a wave, or if the nose strikes before the tail, if the platform from which the torpedo has been firing is moving rapidly, there will be a deflective force applied to the torpedo, the resultant of which will be in another direction, as already explained. Again, when the propellers, which are rapidly rotating in the air, strike the water, they will act like a sudden brake applied to the driven shafts, and this braking effect will be greatly magnified when it reaches the turbine wheels. Thus if the propellers rotate with one-seventh of the angular velocity of the turbine wheels, the slowing down of ten revolutions on the propellers would mean 70 revolutions on the turbine wheels, and although the mass of these wheels may be small, the kinetic energy is measured by the mass multiplied by the square of the velocity or $\frac{Mv^2}{2g}$. This sudden slowing down of the turbine wheels will re-act on the shell of the torpedo, causing disturbing factors to enter the calculated path of the torpedo.

The rising or the diving of the torpedo can be taken care of within bounds by the immersion apparatus, but the lateral deflection and the rolling of the torpedo about its longitudinal axis are serious objections to turbine driven torpedoes, as hitherto developed. The lateral deflection, which may or may not be wholly or partly occasioned by the roll, frequently causes an initial shear which causes the torpedo to travel at an angle laterally with the calculated path before the automatic steering gear takes charge and brings the torpedo back, not to the true path, but to a path parallel to the true path. This angular deflection often causes the torpedo to miss the target altogether. The roll of the torpedo is objectionable from various standpoints; first, and probably most important, it interferes with the proper relative action of the horizontal and the vertical steering rudders. For instance, if the torpedo rolls through 90 degrees, while in the air, the horizontal steering rudders would then be vertical, and the vertical steering rudders horizontal, and the resulting effect would be wholly objectionable. If the roll is less than 90 degrees, the objection would remain, but in a less degree. Again, if the roll is sufficient, it would obviously interfere with the pendulum ordinarily used in connection with the gyroscope, and it might empty or put out the alcohol lamp for heating up the air fed to the turbine. There are various other objections, which need not be further mentioned, as the remedy proposed is intended to, and does, provide for all of the objectionable gyroscopic effects hereinbefore set out.

My invention consists in substance in so arranging the apparatus, that substantially perfect dynamic stability is secured. In other words, I provide a system built up of a series of oppositely moving parts used in driving the torpedo, so arranged that the sum of the moments of inertia of all the parts rotating in one direction shall balance the moments of inertia of all of the parts rotating in the opposite direction. This is accomplished by the apparatus shown in the accompanying drawings in which the same parts are indicated by the same letters throughout the several views.

Figure 8:
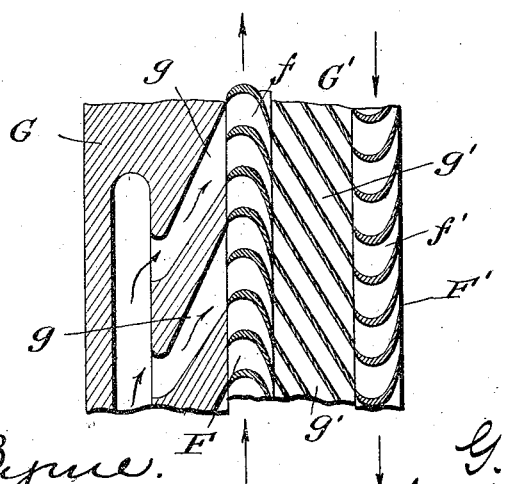
Figure 9:
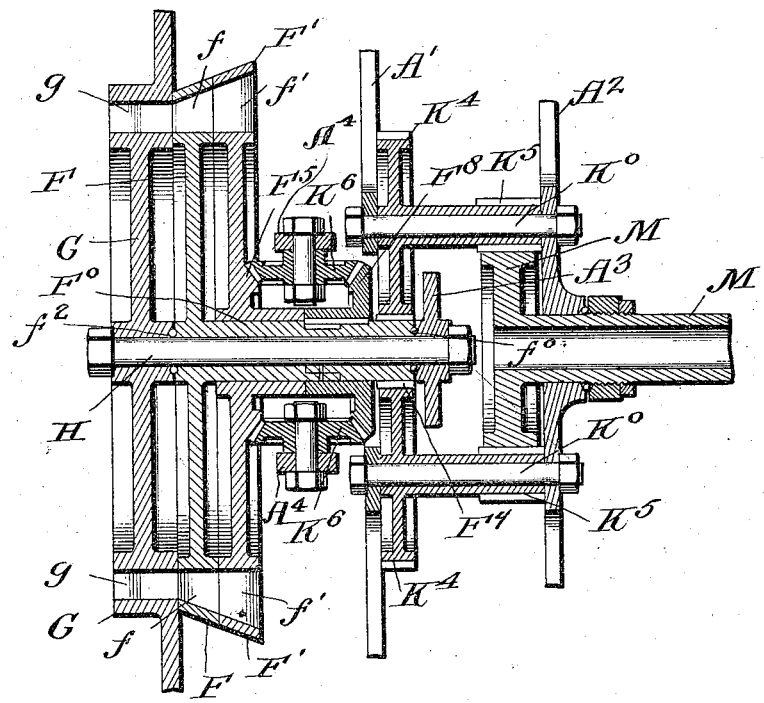
Figure 10:
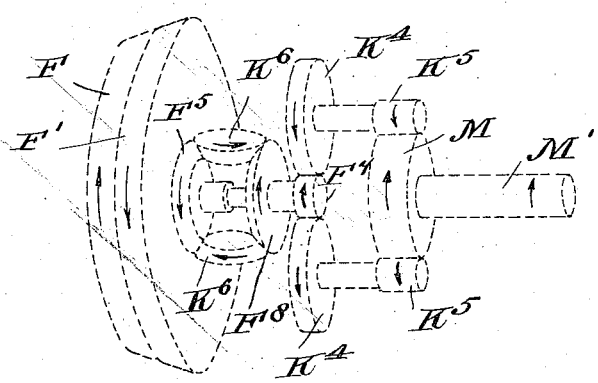

Figure 1 shows a side elevation of a torpedo with the driving gear constructed according to my invention, the driving apparatus being shown in dotted lines; Fig. 2 is a similar view showing diagrammatically another form of driving apparatus constructed according to my invention; Fig. 3 is a vertical longitudinal section through the tail of the torpedo, shown in Fig. 1 with parts being on a larger scale and parts being broken away; Fig. 4 shows a section along the line 4—4 of Fig. 3, and looking in the direction of the arrows; Fig. 5 shows a section along the line 5—5 of Fig. 3, and looking in the direction of the arrows; Fig. 6 shows, diagrammatically the double stage turbine indicated in Fig. 3; Fig. 7 shows a section similar to that indicated in Fig. 3, and illustrates a modification of the driving apparatus, including the turbines and reducing gear; Fig. 8 is a diagram showing the double stage turbines used in Fig. 7; Fig. 9 is a view similar to Fig. 7, but shows another modification of the arrangement for driving the propeller shaft from the turbine wheels; and Fig. 10 is a diagram in perspective showing the gearing illustrated in Fig. 9.

A, Figs. 1 to 5, shows the shell of the torpedo carrying the air flask B, and provided with various transverse bearings A' A² A³ for gearings, which will be hereinafter described.

C represents vertical rudders or steering rudders, and D represents the web in which the horizontal or diving rudders (not shown) are mounted. The control of the vertical and horizontal rudders does not constitute a part of my present invention, and will not be further described.

E E', see Figs. 1 and 3, are two propellers mounted to rotate in reverse directions about a common axis.

$E^2$ $E^3$, shown in Fig. 2, are two propellers mounted to rotate in opposite directions about different axes.

Since Fig. 2 shows the apparatus in its simplest form, it will be first described. In this figure, $F^2$ $F^3$, are two turbine wheels, which may be single stage or multiple stage as desired, which are mounted respectively on the shafts $y$ $y'$, each shaft carrying a pinion $x$ $x'$, which pinions are connected by the gears $x^2$ $x^3$. The turbines $F^2$ $F^3$ are caused to rotate in reverse directions, and these gears $x^2$ $x^3$ will cause the propellers $E^2$ $E^3$ to rotate at precisely the same speed, but in reverse directions, so that if the mass and dimensions of the rotating parts are the same, the moments of inertia in opposite directions will balance each other and dynamic stability will be secured.

It will be obvious that the pinions $x$ $x'$ might mesh directly with each other, thus avoiding the necessity for the idlers $x^2$ $x^3$, but these are inserted for convenience of arrangement in the limited space inside of the torpedo.

While the arrangement shown in Fig. 2 illustrates the operation of the device in the simplest form, I prefer one of the arrangements shown in the other figures, preferably, that shown in Figs. 1 to 6, which will now be described. These figures show the preferred form of apparatus, in which the turbines F, F' are provided with expanding vanes $f$ and $f'$ receiving air from nozzles $g$ mounted in the partition plate G. The turbine F is provided with a sleeve $F^0$, which, for convenience of manufacture, is splined to the turbine wheel as at $f^0$, but which may be made integral with said turbine wheel, if desired. This sleeve $F^0$ rotates on the fixed shaft H and carries a pinion I. The other turbine wheel F' has a sleeve $F^2$, which rotates on the inner sleeve $F^0$, being separated therefrom by ball bearings $f^2$. This outer sleeve $F^2$ carries a pinion I', which meshes in the pinions K' on the two shafts $K^0$. These pinions K' are each integral with or secured to a sleeve $K^2$, which sleeve carries a pinion K. This pinion K meshes with an idler L, see Fig. 4, which in turn meshes with the pinion I fast to the sleeve $F^0$. Each of the sleeves $K^2$ also carries a pinion $K^3$, which meshes with the spur wheel M fast on the hollow shaft M', which is connected in any suitable way, as by the coupling $m^3$ to the hollow shaft $M^2$. This shaft is expanded to form the hollow propeller shaft $M^3$, and this hollow shaft is provided with escape passages $m^2$ for the air escaping from the turbines, and with a valve seat $m^4$ for the tail valve N, which is secured to a support $n$. I do not claim any specific construction of tail valve, as this is well known in the art. In rear of the hollow propeller shaft $M^3$ there is an opening in the tail of the torpedo, as at $A^0$. One of the propellers E' is secured to this propeller shaft $M^3$, and the other propeller E is mounted on a hollow shaft P' concentric with the shaft $M^3$ and provided with a bevel gear P, which meshes with the bevel wheels O, which in turn mesh with the bevel pinion $M^4$ on the shaft $M^3$. Thus the rotation of the shaft M' in one direction will cause the shafts $M^3$ and P', and the propellers carried thereby, to rotate in reverse directions.

It will be noted that I provide duplicate sets of gear wheels K, K, and duplicate bevel gears O, etc., so that the rotating parts may be symmetrically disposed on opposite sides of a common axis, and since these wheels rotate in reverse directions their moments of inertia will neutralize each other.

It will be noted that the spur wheel M, shafts M', $M^2$ and $M^3$, and the propeller E' all rotate in one direction, and there is nothing to counterbalance this but the propeller E and the hollow shaft P', which rotate in opposite directions, but the moments of inertia of these two groups of parts may be equalized by making the propeller head $E^0$ or the hollow shaft P' considerably heavier than the structural strength would demand, so that the sum of the moments of inertia may be made zero. The requisite proportion of the parts may be readily determined by either calculation or experiment.

In the form of device shown in Figs. 7 and 8, the two turbine wheels F and F' are separated by a casting G' having nozzles $g'$. This casting is annular in shape, and journaled on the interior thereof are bevel gears $K^4$ meshing in bevel teeth $F^4$ and $F^5$ carried by the wheels F and F' respectively. The wheel F' carries the sleeve $F^6$ carrying a pinion $F^7$ meshing with the gear wheels $K^4$ on the shafts $K^0$. These gear wheels $K^4$ drive pinions $K^5$ meshing with the spur wheel M secured to the shaft M', driving the propellers, as already described with reference to Fig. 3.

In the form of device shown in Figs. 9 and 10, the nozzles and turbine wheels are arranged substantially as shown in Fig. 3, but the sleeve $F^0$ carries a bevel gear $F^8$, which meshes with bevel gears $K^6$ journaled in bearings $A^4$ made fast to the shell of the torpedo. These bevel gears $K^6$ mesh with the bevel teeth $F^5$ on the turbine wheel F'. The sleeve $F^0$ also carries a pinion $F^7$ meshing with the gear wheels $K^4$ journaled on the fixed shafts $K^0$. These gear wheels $K^4$ drive pinions $K^5$ meshing with the spur wheel M fast on the shaft M' which drives the propellers, as already described with reference to Fig. 3.

It will be seen that, in all of the modifications illustrated in Figs. 3 to 10, the two turbine wheels rotate in opposite directions and are geared together so that they must rotate at precisely equal speeds. In the same way the other gear wheels, symmetrically disposed on either side of the axis of the propeller shaft, are so geared that pairs of each will revolve at equal speeds, but the two members of each pair in opposite directions. Now by equalizing the weights of pairs of wheels revolving at equal speeds in reverse directions, the sum of the moments of inertia of each pair will become zero. Where, as in the case of the two turbine wheels, one is slightly larger than the other, the weights may be so arranged that the moments of inertia of each shall be the same, and since the two wheels revovle in opposite directions the sum of these moments will become zero. Thus it will be seen that by any of the herein-described arrangements, substantially perfect dynamic stability is secured, and all gyroscopic effect due to the rotation of the parts within the torpedo is entirely obviated.

It will be obvious that various modifications might be made in the herein described apparatus, which could be used without departing from the spirit of my invention.

Having thus described my invention, what I claim and desire to secure by Letters Patent of the United States, is:—

1. The method of compensating torpedoes driven by turbines or other forms of rotary engines or rotary devices, against errors in direction occasioned by gyroscopic action of the rotating parts, which consists in so arranging the rotating parts as to cause the moments of inertia in one direction to neutralize the moments of inertia in the opposite direction so that the sum of the moments of inertia of the system shall be zero, substantially as described.

2. The method of compensating torpedoes driven by turbines or other forms of rotary engines or rotary devices, against errors in direction occasioned by gyroscopic action of the rotating parts, which consists in mounting the rotating parts symmetrically in pairs about a common axis, in driving the two members of each pair of parts in reverse directions at equal speeds and in proportioning the weights and dimensions of these parts so that the sum of the moments of inertia in one direction may neutralize the sum of the moments of inertia in the reverse direction, causing a resultant dynamic stability, substantially as described.

3. In an automobile torpedo, the combination with two driving wheels rotating in opposite directions at equal speeds and having the same moments of inertia, of balanced reduction gearing driven by said wheels in opposite directions and having the sum of the moments of inertia zero, and a pair of propellers driven by said reduction gearing in reverse directions and with equal angular velocity, substantially as described.

4. In a submarine torpedo, the combination with a double staged turbine engine having turbine wheels of equal moments of inertia revolving in opposite directions and at equal angular velocities, of a double system of reduction gearing driven by said wheels, the sum of the moments of inertia of said system being zero, and propellers driven in reverse directions and at equal speeds by said reduction gearing, substantially as described.

5. In an automobile torpedo, the combination with two driving wheels rotating in opposite directions at equal speeds and having the same moments of inertia, of balanced reduction gearing driven by said wheels in opposite directions and having the sum of the moments of inertia zero, and a pair of propellers driven by said reduction gearing in reverse directions and with equal angular velocity, with the weights of the propellers and propeller shafts and other parts driven by said reduction gearing so arranged as to cause the sum of the moments of inertia of the same to become zero, substantially as described.

In testimony whereof, I affix my signature, in presence of two witnesses.

GREGORY C. DAVISON.

Witnesses:
A. L. HOUGH,
MARTHA C. BODINE.